United States Patent
Jousselin

(10) Patent No.: US 9,494,491 B2
(45) Date of Patent: Nov. 15, 2016

(54) BLADE TIP TIMING UNCERTAINTY

(71) Applicant: ROLLS-ROYCE PLC, London (GB)

(72) Inventor: Olivier Jousselin, Bristol (GB)

(73) Assignee: ROLLS-ROYCE plc, London (GB)

( * ) Notice: Subject to any disclaimer, the term of this patent is extended or adjusted under 35 U.S.C. 154(b) by 703 days.

(21) Appl. No.: 13/747,959

(22) Filed: Jan. 23, 2013

(65) Prior Publication Data

US 2013/0226518 A1   Aug. 29, 2013

(30) Foreign Application Priority Data

Feb. 24, 2012   (GB) .................................. 1203181.1

(51) Int. Cl.
   *G01M 15/14* (2006.01)
   *G01H 1/00* (2006.01)
   *G06F 17/16* (2006.01)

(52) U.S. Cl.
   CPC ............. *G01M 15/14* (2013.01); *G01H 1/003* (2013.01); *G06F 17/16* (2013.01)

(58) Field of Classification Search
   CPC ..... G01N 29/04; G01N 29/00; G01M 15/14; G01M 13/028; G01H 1/003; G06F 17/16
   See application file for complete search history.

(56) References Cited

U.S. PATENT DOCUMENTS

2009/0319206 A1*  12/2009  Russhard et al. ............... 702/56
2010/0153031 A1*   6/2010  Russhard ........................ 702/56

FOREIGN PATENT DOCUMENTS

EP   2 136 189 A3   12/2009
GB   2466817 A      7/2010

OTHER PUBLICATIONS

Jousslelin, O; Russhard, P; Bonello P, A Method for Establishing the Uncertainty Levels for Aero-Engine Blade Tip Amplitudes Extracted from Blade Tip Timing Data, 10th International Conference on Vibrations in Rotating Machinery, pp. 211-220 (Sep. 11-13, 2012, IMechE, London).*
I B Carrington, J R Wright, J E Cooper and G Dimitriadis, "A comparison of blade tip timing data analysis methods," Proc Instn Mech Engrs vol. 215 Part G, 301-312 (2001).*
May 30, 2012 Search Report issued in British Patent Application No. GB1203181.1.

* cited by examiner

*Primary Examiner* — Paul D Lee
*Assistant Examiner* — Mark Crohn
(74) *Attorney, Agent, or Firm* — Oliff PLC

(57) ABSTRACT

A method of determining blade tip timing measurement uncertainty comprising measuring time of arrival of each of a set of blades at each of a reference set of stationary probes. A reference blade tip parameter is derived from the measurements and the position of each of the probes. A reference condition number is calculated from the position of each of the probes and each targeted engine order, and then a mean calculated. Combinations of fewer probes are determined. For each combination, a condition number is calculated and then a mean condition number is calculated. The combination means are ordered relative to the reference mean and a predetermined number of combinations are selected. A blade tip parameter is derived for the selected combinations. Finally uncertainty of the blade tip parameter for each selected combination is calculated as a percentage of the reference blade tip parameter.

18 Claims, 1 Drawing Sheet

BLADE TIP TIMING UNCERTAINTY

The present invention relates to determining the uncertainty of blade tip timing measurements, for example measurements of bladed rotors which are subject to vibration.

It is known to determine uncertainty by attaching strain gauges to rotor blades and processing the strain measurements relative to modeled or expected values. However, this is costly in terms of time and weight. Therefore, typically such strain gauges are attached to development rotors only. Disadvantageously, increased uncertainty during use, resulting from wear or other forms of degradation, may not be captured.

The present invention provides a method of determining blade tip timing measurement uncertainty that seeks to address the aforementioned problems.

Accordingly the present invention provides a method of determining blade tip timing measurement uncertainty comprising: a) measuring time of arrival of each of a set of blades at each of a reference set of stationary probes; b) deriving a reference blade tip parameter from the measurements and the position of each of the probes; c) calculating a reference condition number from the position of each of the probes and each targeted engine order; d) calculating a reference mean condition number from the reference condition numbers; e) defining an integer subset x and determining all combinations of x probes; f) for each combination, calculating a condition number from the position of each probe of the reference set of probes and each targeted engine order; g) for each combination, calculating a combination mean condition number from the combination condition numbers; h) ordering the combination means from step g) relative to the reference mean and selecting a predetermined number of combinations; i) deriving a blade tip parameter from the measurements and the position of each probe of the selected combination; and j) calculating uncertainty of the blade tip parameter for each selected combination as a percentage of the reference blade tip parameter.

Advantageously the method enables uncertainty to be determined from the blade tip timing measurements and probe positions alone rather than requiring additional equipment. Thus weight and cost savings result.

The reference set of probes, $x_{ref}$, may comprise nine probes. A minimum number of probes $x_{min}$ may be calculated as twice the number of simultaneous modes excited plus two. Thus where only one mode is excited at once, $x_{min}$ is 4 (2x1+2).

The method may comprise a further step, between steps h) and i), of iterating steps e), f) and g) until x has taken every integer between $x_{min}$ and ($x_{ref}$-1). Advantageously, this provides a systematic approach.

The predetermined number of combinations may be five. This is not too computationally intensive and removes anomalous results but is a large enough selection to provide meaningful averages.

The probes may be angularly spaced from each other around the rotor. The spacing of the probes may be irregular; particularly the spacing between each pair of adjacent probes may be different to the spacing between any other pair of adjacent probes. The spacing of the probes may be determined by excitation modes of the blades.

The blade tip parameter and the reference blade tip parameter may comprise the same parameter. The parameter may comprise one of the group comprising amplitude, frequency and coherence. Thus the blade tip parameter and the reference blade tip parameter may both be amplitude; alternatively they may both be frequency or coherence. The method may be iterated for each parameter so that the blade tip parameter and the reference blade tip parameter are, successively, amplitude, frequency and then coherence. The order is unimportant.

Steps b) and i) may each comprise: a) subtracting the measured time of arrival from an expected time of arrival to give a time difference; b) calculating a displacement from the time difference and the speed of the blades; c) fitting a wave to the displacements having sine and cosine components; and d) deriving the parameter from the wave. The sine and cosine components may each have argument comprising the targeted engine order multiplied by the angular position of each probe.

Steps c) and f) may each comprise: a) forming a matrix having a column for each component of the fitted wave and a row for each probe; b) applying singular value decomposition to the matrix to extract the singular values; and c) setting the condition number to be the ratio of the largest to the smallest of the singular values.

The present invention also provides a rotor assembly comprising a rotor, a set of blades mounted to the rotor, a casing that surrounds the blades, and a processor comprising the method as described above.

The present invention also provides a gas turbine engine comprising the rotor assembly described and/or the method described.

Each of the optional features of the invention may be included in separately or in any combination except where they are mutually exclusive.

The present invention will be more fully described by way of example with reference to the accompanying drawings, in which.

Figure 1:
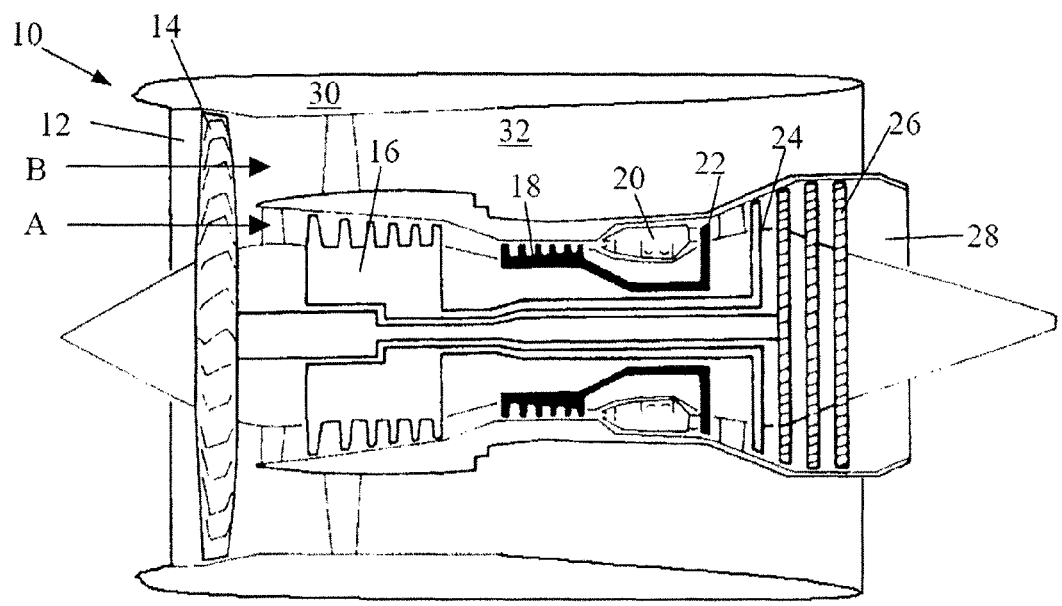
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Figure 2:
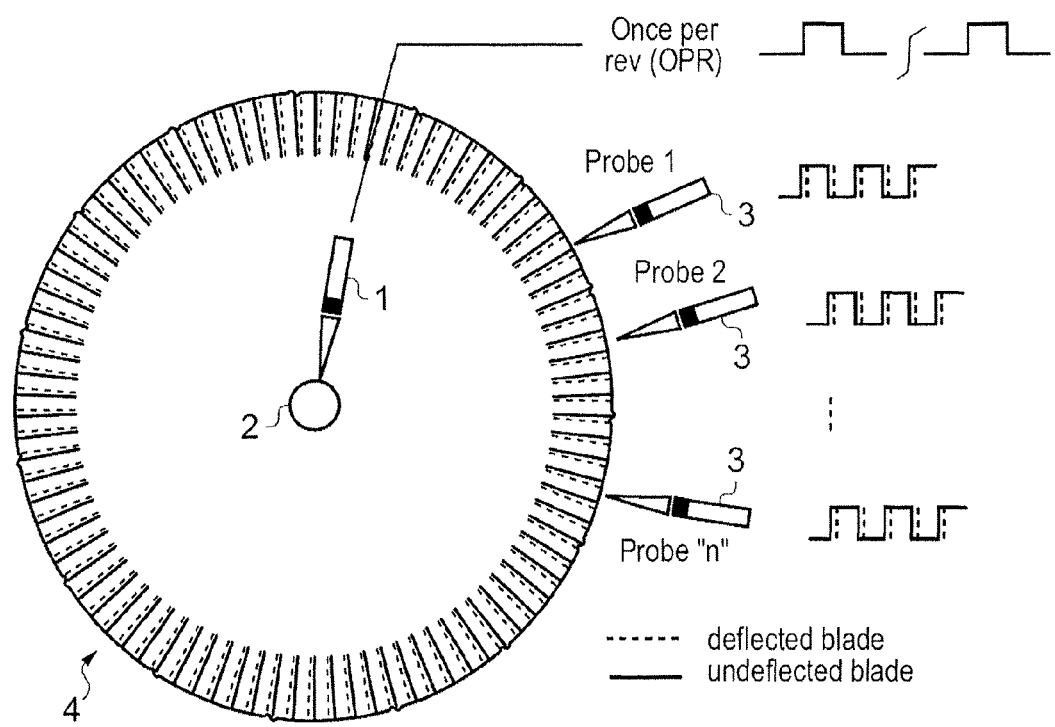
FIG. 2 is a schematic drawing of a blade tip timing arrangement.

FIG. 2 shows schematically a blade tip timing (BTT) arrangement. A once per revolution probe 1 monitors the angular position of the rotor 2. BTT probes 3 are mounted to a casing (not shown) and provide time of arrival measurements of the blades 4 mounted to the rotor 2. For example, the rotor 2 and blades 4 arrangement may be the fan 14, one of the stages of the intermediate pressure or high pressure compressor 16, 18 or one of the stages of the low pressure, intermediate pressure or high pressure turbine 22, 24, 26.

In an embodiment of the present invention there are nine BTT probes 3 provided which are spaced around at least some of the circumference of the casing and form a reference set $x_{ref}$. Alternatively there may be a different number of probes 3. Preferably the probes 3 are irregularly spaced so that vibrations at different excitation frequencies are captured. An example set of probes may be located at 353.2°, 326.6°, 319.1°, 295.7°, 285.7°, 271.9°, 264.5°, 237.4° and 207.3°, each measured from top dead centre of the engine 10.

In a first step of the method of the present invention the time of arrival of each of the blades 4 at each probe 3 is measured for one revolution of the rotor 2. The predicted time of arrival of each blade 4 at each probe 3 may be calculated from the rotational speed of the blade tip and the position of the probe 3. Due to vibration experienced by the rotor 2 and/or the blades 4, the measured time of arrival will differ from the predicted time of arrival by a time difference. The vibration may be synchronous, that is it comprises a frequency that is an integer multiple of the rotor speed, or asynchronous, that is it comprises a frequency that is a non-integer multiple of the rotor speed. Synchronous vibration may be caused by mechanical excitation, whereas asynchronous vibration is caused by non-mechanical excitation such as acoustic noise, rotating stall or blade flutter.

The measured times of arrival can be plotted against the angular probe positions and a wave fitted to the points. The wave will be in the form of an offset $a_0$ plus a constant $a_1$ multiplied by a sine component plus another constant $a_2$ multiplied by a cosine component. The amplitude of the fitted wave is thus $\sqrt{a_1^2+a_2^2}$ and its frequency can be expressed as a targeted engine order EO multiplied by the rotational speed of the rotor 2. Coherence is defined as the correlation of the measured to the predicted times of arrival, and ranges between 0 and 1 inclusive. Amplitude, frequency and coherence are each blade tip parameters that can be derived from the measured times of arrival and the position of each probe 3. The reference blade tip parameter is the amplitude, frequency or coherence derived from the measured times of arrival at each probe 3 in the reference set $x_{ref}$.

The next step in the method of the present invention comprises calculating a reference condition number. One way of calculating it is by forming a matrix having a column for each component of the fitted wave and a row for each probe 3. The angular position of the jth probe 3 in radians is $\phi_j$. Thus for the nine probes 3 of the reference set $x_{ref}$ the matrix has nine rows and three columns thus:

$$\begin{bmatrix} 1 & \sin(EO\phi_1) & \cos(EO\phi_1) \\ \ldots & \ldots & \ldots \\ 1 & \sin(EO\phi_9) & \cos(EO\phi_9) \end{bmatrix}$$

To calculate the reference condition number, singular value decomposition is applied to the matrix to extract the singular values. The reference condition number is the ratio of the largest to the smallest singular value.

The steps of the method are repeated for various rotor speeds of interest, from which a multitude of targeted engine orders EO, reference blade tip parameter values and reference condition numbers are derived. The reference mean condition number is calculated by summing the reference condition numbers and dividing by the number of condition numbers (which is the number of targeted engine orders EO).

The next step of the method of the present invention comprises defining a subset x where x is an integer. Systematically, set x equal to one less than the number of probes 3 in the reference set $x_{ref}$ which is eight when there are nine probes 3 in the reference set $x_{ref}$. Determine all the possible combinations of x probes 3, where order does not matter $^{x_{ref}}C_x$. Thus where x=8, there are nine possible combinations.

For each combination, calculate a condition number in the same manner as the reference condition number was calculated. For x=8 the matrix has three columns and eight rows and there is a matrix for each combination. For each combination, a combination mean condition number is calculated by summing the condition numbers for each targeted engine order EO and dividing by the number of condition numbers.

Once all the combinations have a mean condition number, these are ordered and a predetermined number of combinations are selected based on a comparison of them with the reference mean condition number. For example, the predetermined number may be five so that the five combinations with mean condition number closest to the reference mean condition number are selected.

For each of the selected combinations a blade tip parameter is derived from the time of arrival measurements and the position of each selected probe 3. The parameter is derived in the same manner as the reference parameter.

The final step of the method calculates the uncertainty of the blade tip parameter as a percentage of the reference blade tip parameter.

The method can be iterated for smaller subsets x. It will be understood that for a smaller subset x, the number of combinations $^{x_{ref}}C_x$ increases. For example, where x=7 there are 36 combinations and where x=6 there are 336 combinations. The minimum permissible number of probes in the subset is calculated as twice the number of simultaneous modes excited plus two. Thus, where only one mode is excited at a time the minimum number of probes $x_{min}$ is four.

Although the method steps have been described in a particular order, some of the steps may be performed in a different order as will be apparent to the skilled reader. For example, the step of deriving a blade tip parameter could be performed before the step of ordering the combination means and selecting a predetermined number of combinations. This will be more computationally intensive but may be appropriate for some applications of the method of the present invention.

Advantageously, steps of the method of the present invention can be repeated for each blade tip parameter of interest. Thus the method may initially be performed to determine the uncertainty in amplitude measurements and then be repeated for frequency and/or coherence.

The method of the present invention can be applied to blade tip timing measurements howsoever obtained. The measurements may be obtained in development or during operational running. Thus it has applications in any bladed rotor in a gas turbine engine for aerospace, marine or industrial use, such as fan blades, compressor stages and turbine stages. It also has potential application for wind and tidal turbines.

The invention claimed is:

1. A method of determining blade tip timing measurement uncertainty comprising:
   a) irregularly spacing a reference set of stationary probes around at least a portion of a circumference of a casing in a rotor assembly so that vibrations at different excitation frequencies are captured, wherein a minimum number of the stationary probes is two plus twice a number of simultaneous excitation modes of blades that are mounted to the rotor assembly;
   b) measuring time of arrival of each of the blades at each of the stationary probes;
   c) deriving a reference blade tip parameter from the measurements and a position of each of the stationary, probes;
   d) calculating a reference condition number from the position of each of the stationary probes and each targeted engine order;
   e) calculating a reference mean condition number from the reference condition numbers;

f) defining an integer subset x and determining all combinations of x stationary probes;
g) for each combination, calculating a condition number from the position of each probe of the reference set of stationary probes and each targeted engine order;
h) for each combination, calculating a combination mean condition number from the combination condition numbers;
i) ordering the combination means from step h) relative to the reference mean and selecting a predetermined number of combinations;
j) deriving a blade tip parameter from the measurements and the position of each probe of the selected combination;
k) calculating uncertainty of the blade tip parameter for each selected combination as a percentage of the reference blade tip parameter; and
(l) tracking and outputting the uncertainty of the blade tip parameter to determine deterioration of the rotor assembly.

2. A method as claimed in claim 1 wherein the reference set of stationary probes, $x_{ref}$, comprises nine probes.

3. A method as claimed in claim 2 wherein the predetermined number of combinations comprises five.

4. A method as claimed in claim 1 wherein a minimum number of stationary probes $x_{min}$ is calculated as twice the number of simultaneous modes excited plus two.

5. A method as claimed in claim 4 wherein the predetermined number of combinations comprises five.

6. A method as claimed in claim 1 further comprising a step, between steps i) and j), of iterating steps f), g) and h) until x has taken every integer between the minimum number of stationary probes and one fewer than the number of probes in the reference set of stationery probes.

7. A method as claimed in claim 6 wherein the predetermined number of combinations comprises five.

8. A method as claimed in claim 1 wherein the predetermined number of combinations comprises five.

9. A method as claimed in claim 1 wherein the stationary probes are angularly spaced.

10. A method as claimed in claim 9 wherein the spacing of the stationary probes is determined by excitation modes of the blades.

11. A method as claimed in claim 1 wherein the blade tip parameter and the reference blade tip parameter comprise the same parameter.

12. A method as claimed in claim 11 wherein the parameter comprises one of the group comprising amplitude, frequency and coherence.

13. A method as claimed in claim 12 wherein the method is iterated for each parameter.

14. A method as claimed in claim 1 wherein step 1c) and 1j) each comprise:
   a) subtracting the measured time of arrival from an expected time of arrival to give a time difference;
   b) calculating a displacement from the time difference and the speed of the blades;
   c) fitting a wave to the displacements having sine and cosine components; and
   d) deriving the parameter from the wave.

15. A method as claimed in claim 14 wherein the sine and cosine components each have argument comprising the targeted engine order multiplied by the angular position of each probe.

16. A method as claimed in claim 14 wherein step 1d) and 1g) each comprise:
   a) forming a matrix having a column for each component of the fitted wave and a row for each probe;
   b) applying singular variable decomposition to the matrix to extract the singular values; and
   c) setting the condition number to be the ratio of the largest to the smallest of the singular values.

17. A rotor assembly comprising a rotor, a set of blades mounted to the rotor, a casing that surrounds the blades, and a processor arranged to perform the method as claimed in claim 1.

18. A gas turbine engine comprising the rotor assembly as claimed in claim 17.

* * * * *